Patented Oct. 22, 1946

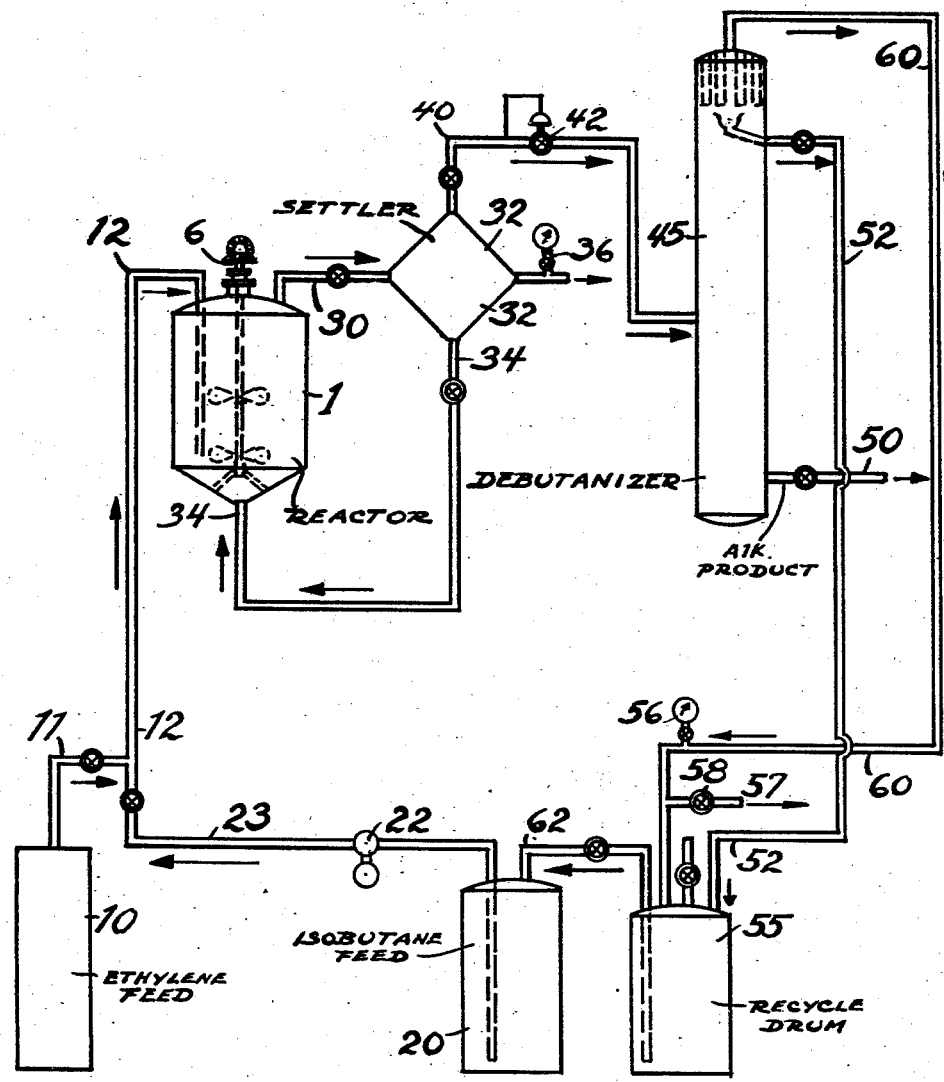

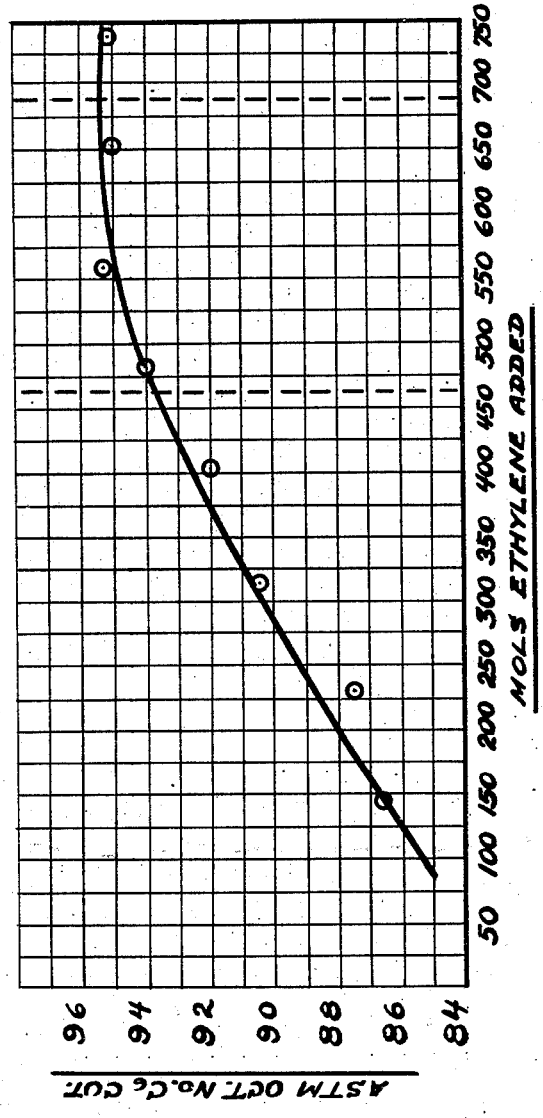

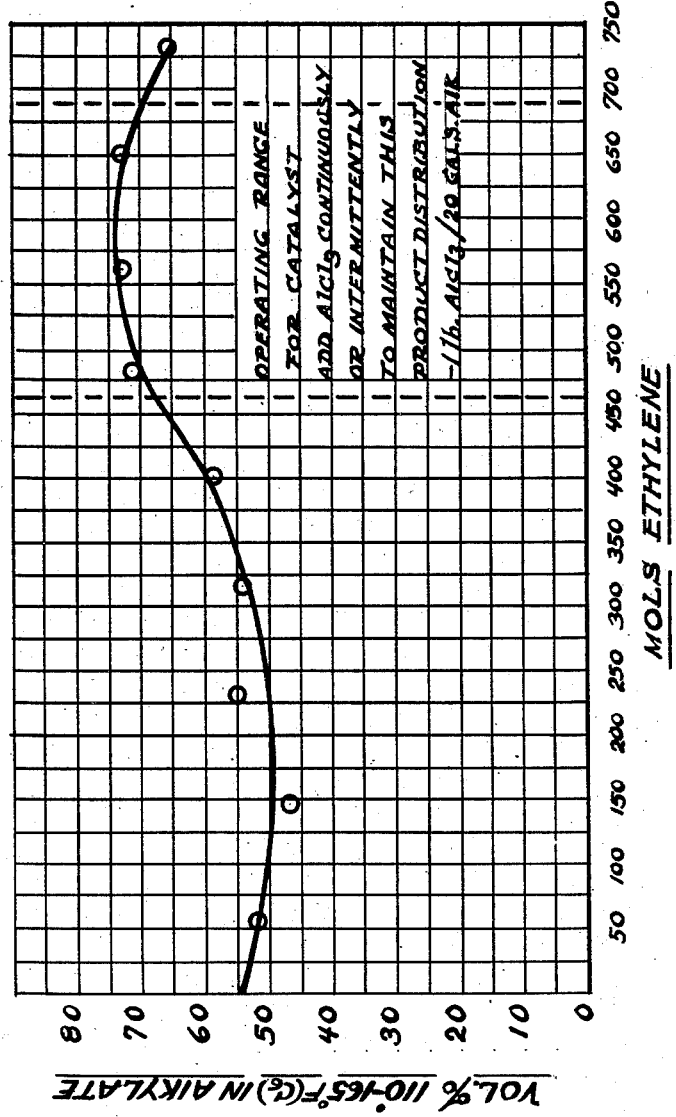

2,409,681

UNITED STATES PATENT OFFICE 2,409,681

CHEMICAL PROCESS

Ralph M. Hill, Mountainside, and Charles H. Watkins, Cranford, N. J., assignors to Standard Oil Development Company, a corporation of Delaware Application January 13, 1943, Serial No. 472,192

6 Claims. (Cl. 260—683.4)

The present invention relates to improvements in the production of aviation and motor gasoline with particular reference to the production of so-called "alkylates," that is to say, reaction products produced by reacting together an isoparaffin and an olefin to produce a highly branch chain paraffin boiling in the aviation and motor gasoline range. More particularly, our present invention relates to a catalyst which is particularly active in catalyzing the reaction between an isoparaffin, such as isobutane, and lower molecular weight olefin, such as ethylene to produce products of high octane number in good yields.

Heretofore the alkylation of isobutane with butylene or higher molecular weight olefins has been successfully accomplished. These olefins react with isoparaffins in the presence of concentrated sulfuric acid at about atmospheric temperatures to produce good yields of high quality alkylates. However, the alkylation of the lower members of the olefin series, such as ethylene and propylene, when carried out in the presence of sulfuric acid and under the same conditions at which the butylenes and the pentenes are alkylated satisfactorily, does not give good results in the case of ethylene and propylene alkylation.

We have now developed a process for alkylating the lower members of the olefinic series to give good yields of high quality alkylate. We have found that aluminum chloride-hydrocarbon complex prepared by intimately mixing aluminum chloride with an isoparaffin and an olefin gives a product which is effective in the alkylation of the lower molecular weight olefins. The aluminum chloride-hydrocarbon complex is a brown liquid having a density of about 1.2. We have found that this catalyst gives better results when it is activated with a chloride, such as hydrogen chloride, but preferably an alkyl chloride, such as ethyl chloride.

The main object of our present invention is to alkylate an isoparaffin, such as isobutane, with a low molecular weight olefin, such as ethylene.

A more specific object of our invention is to produce in good yields, rich mixture blending agents for aviation gasoline such as 2,3 dimethylbutane, which is a substance having a rich mixture performance rating such that when it is leaded with 4 cc. of lead tetraethyl per gallon, it has a rich mixture performance in excess of pure isooctane plus 6 cc. of lead tetraethyl per gallon.

Other and further objects of our invention will appear from the following more detailed description and claims.

In the accompanying drawings, we have shown in Fig. I a diagram indicating a preferred modification of our invention; in Fig. II, we have shown a chart indicating the relationship between mols of ethylene added to the aluminum chloride-hydrocarbon complex and the operating conditions which give a high octane number product; and in Fig. III, we have shown a second chart indicating the relationship between the desirable 110°–165° F. fraction in the alkylate and the mols of ethylene added to the aluminum chloride. The significance and meaning of these charts will become apparent as the description of the process proceeds.

We believe the main advantage of our present invention resides in the catalyst we employ and in the method of preparing the catalyst, and we shall now proceed to describe fully the method of preparing our new catalyst.

Example 1

Two pounds of chemically pure aluminum chloride were charged to a 3 gallon turbo mixer reactor along with 6 liters of isobutane. The materials were mixed at room temperature in the reactor which was closed, the pressure within the reactor at the beginning being 30.7 lbs. per square inch, approximately. Hydrogen chloride was forced into the reactor until the pressure was increased to about 80.7 lbs. per square inch and, at the same time, the temperature was increased to 150° F. At this point, ethylene was added at the rate of 10 mols per hour over a period of 5 hours while constantly agitating the mixture, the pressure meanwhile varying between 175–200 lbs. per square inch. On completion of the ethylene addition, the reaction mixture was stirred an additional half hour and then the mixture was permitted to settle into an upper hydrocarbon layer and a lower layer consisting of a mixture of an aluminum chloride-hydrocarbon complex. The upper hydrocarbon layer was drawn off and debutanized, (that is, distilled to remove $C_4$ and lighter hydrocarbons) and the debutanizer bottoms had the following composition:

| Boiling range | Vol. percent |
| --- | --- |
| 60–110 ($C_5$) | 42 |
| 110–165 ($C_6$) | 35 |
| 165–265 ($C_7$–$C_8$) | 18 |
| 265–335 | 2 |
| Bottoms | 3 |
| ASTM Oct. No.: | |
| 110–165 ($C_6$) | 80.9 |
| $Br_2$ No. $C_6$ Cut | Nil |

The lower layer contained AlCl₃-hydrocarbon complex, and using this lower layer as catalyst we made a series of six additional runs, in which runs the conditions were the same as to temperature, pressure, and the relative amount of hydrogen chloride used. The isobutane-olefin feed during these additional runs was in the ratio of 2 mols of isobutane to 1 of olefin. For comparative purposes, we set forth below inspection data on the first run we made under run No. 1, side by side with the additional runs, 2–7, inclusive, as follows:

|  | Run No. | | | | | | |
|---|---|---|---|---|---|---|---|
|  | 1 | 2 | 3 | 4 | 5 | 6 | 7 |
| Wt. per cent alkylate yield based on ethylene | 167 | 196 | 213 | 196 | 175 | 183 | 187 |
| Prod. distribution: | | | | | | | |
| Vol. per cent C₅ cut¹ (60–110° F.) | 42 | 25 | 13 |  | 3 | 3 | 4 |
| C₆ (110–165) | 35 | 52 | 65 |  | 70 | 73 | 71 |
| C₇–C₈ cut (165–265) | 18 | 17 | 17 |  | 19 | 17 | 18 |
| C₉+ cut | 5 | 6 | 5 |  | 8 | 7 | 7 |
| ASTM Oct. No.: | | | | | | | |
| 110–165° F. (C₆ cut) | 80.9 | 89.1 | 92.8 |  | 91.6 | 92.5 | 92.6 |
| 165–265° F. (C₇–C₈ cut) |  |  |  |  | 86.8 | 86.8 | 86.8 |
| Br. No., Cg/gm.: | | | | | | | |
| C₆ cut | Nil | Nil | Nil | Nil | Nil | Nil | Nil |
| C₇–C₈ | Nil | Nil | Nil | Nil | Nil | Nil | Nil |

¹ Cut = fraction.

In the above runs, the same were "depletion" runs, i. e., no more fresh AlCl₃ was added after that added just prior to run No. 1.

It will be noted from the foregoing data that in the several runs the yields were greater in every instance after the first run. It will be further noted that with respect to the product, the 110°–165° F. fraction greatly increased as to octane number after the first run, reaching a maximum of 92.8 during the third run. The data also show that in the first run where the alkylation was brought about or activated primarily by the aluminum chloride catalyst, the yields and octane number were low but that when the aluminum chloride had reacted with the hydrocarbon to form a complex, both the yields of alkylate and the octane number increased, showing that the hydrocarbon complex is a better catalyst than fresh aluminum chloride.

*Example 2*

In another run which we made, we substituted ethyl chloride for the hydrogen chloride previously employed in Example 1. In this run, we charged 2 lbs. of aluminum chloride to a 1 gallon turbo mixer reactor. We then charged to the reactor isobutane and ethylene in the ratio of about 2 to 3 mols of isobutane to 1 mol of ethylene, including in the feed also 5 volume percent of ethyl chloride based on the isobutane. During this run, we maintained a temperature of 110° F. within the reactor and imposed a pressure of 275 lbs. per square inch.

We call attention at this point to Fig. I which, as indicated previously, illustrates diagrammatically our process, and we shall now refer to the Fig. I for a better understanding of our invention.

The aluminum chloride was placed in the reactor I which was a closed turbo mixer provided with stirring means 6. Thereafter the ethylene was fed from storage 10 through line 11 and line 12 to the reaction vessel 1. Meanwhile isobutane was withdrawn from storage 20, forced by pump 22 through line 23 and thence through line 12 into reactor I. The product was withdrawn from reactor I through line 30 and discharged into a settler 32 where the brown liquid settled out and was withdrawn and returned through line 34 to the reactor. A pressure gauge 36 recorded the pressure existing in the system containing the reactor and the settler. The overhead product from the settler was withdrawn through line 40 carrying a pressure reducing valve 42 and discharged into a debutanizer 45. The product was withdrawn through line 50 and inspected as hereinafter set forth. The unused isobutane and the ethyl chloride were recovered from debutanizer 45 through line 52 and discharged into a drum 55 from which it may be removed through line 62 for recycling to reactor I. A vent line 60 carrying a gauge 56 was also in communication with said drum 55. Excess pressure in vent line 60 may be relieved through valved line 57. A pressure of 80 lbs. per square inch was maintained in line 60 by adjusting valve 58 in line 57.

With respect to the isobutane feed, it is pointed out that the isobutane from tank 20, as well as recycle isobutane, was fed to the reactor at the rate of 21 to 31.5 mols per hour, while the ethylene was fed at the rate of 10.5 mols per hour so as to give an external ratio of isobutane to ethylene (that is, concentration at the point where they enter reactor I of from 2–3:1).

We have set forth below an inspection of the product which we withdrew from time to time during the period of the run which amounted to 72 hours, as follows:

|  | Hours on stream | | | | | | | | |
|---|---|---|---|---|---|---|---|---|---|
|  | 5–8 | 13–16 | 21–24 | 29–32 | 37–40 | 45–48 | 53–56 | 61–64 | 69–72 |
| Wt. percent alkylate based on ethylene (cum.) | 235 | 240 | 245 | 247 | 252 | 255 | 253 | 251 | 249 |
| Prod. distribution: | | | | | | | | | |
| 60–100° F. (C₅), vol. percent | 16 | 26 | 17 | 21 | 19 | 3 | 1 | 1 | 3 |
| 110–165° F. (C₆), vol. percent | 52 | 47 | 55 | 53 | 58 | 72 | 72 | 73 | 66 |
| 165–265° F. (C₇–C₈), percent | 23 | 19 | 19 | 19 | 16 | 18 | 20 | 18 | 20 |
| C₉+, vol. percent | 9 | 8 | 9 | 7 | 7 | 7 | 7 | 8 | 11 |
| ASTM Oct. No.: | | | | | | | | | |
| 110–165° F. cut |  | 86.6 | 87.4 | 90.5 | 92.0 | 94.0 | 95.3 | 94.9 | 95.1 |
| 165–265° F. cut | 71 |  | 67.1 |  | 81.1 | 90.8 | 92.1 | 91.6 | 90.8 |
| Bromine No.: | | | | | | | | | |
| 110–165° F. cut |  | Nil |  |  | Nil |  |  |  | Nil |
| 165–265° F. cut |  | Nil |  |  | Nil |  |  |  | Nil |
| 265° F.+ cut |  | Nil |  |  | 0.3 |  |  |  | 1.1 |

The results of this run again show that after the aluminum chloride-hydrocarbon complex has formed, the octane number of the product increases, as well as the yields, that is to say, the brown liquid which forms by the interaction of the fresh aluminum chloride and the hydrocarbons produces a high quality alkylate in higher yields than does the fresh aluminum chloride, so that our tests have shown that there is an induction period during which the aluminum chloride and the hydrocarbons react to form a complex which is a highly efficient catalyst for alkylating ethylene with isobutane.

Further discussing the run made to the details of Example 2, attention is directed to Figs. II and III. According to Fig. II, it is clear that the best operating conditions are those attained between the vertical dotted lines, that is to say, when 450–700 mols (approximately) of ethylene have been added in this range, it will be noted that the octane rating of the $C_6$ fraction is over 90.

Fig. III shows the amount in volume per cent of the $C_6$ fraction of the alkylate (a very desirable fraction); with respect to the number of mols of ethylene added during the period of the run between the addition of about 450 to about 700 mols of ethylene, the volume per cent of the 110–165° F. fraction of the product was at a maximum.

In the foregoing description, we have described runs which were essentially batch runs, that is to say, the catalyst was run without addition of aluminum chloride until it had become depleted in activity. We wish to point out, however, that after the original induction period which the aluminum chloride-hydrocarbon complex forms, the process may thereafter be operated continuously by adding aluminum chloride at a rate of about 1 lb. per 20 gallons of alkylate and withdrawing spent aluminum chloride at the same rate. Stated otherwise, we have found that for each 200–800 mols of ethylene, we add 1 lb. of AlCl₃.

It will be understood that while we have described in detail the method of alkylating ethylene with isobutane, our process is applicable also to the alkylation of propylene with isobutane and, in fact, includes the alkylation of any olefin with any isoparaffin. We have found, as indicated, that the use of hydrogen chloride as an activator gives good results but better results are obtained by using ethyl chloride in quantities of from 2–6% or thereabouts, based on the isoparaffin feed. Instead of using ethyl chloride, we may use propyl or butyl chloride, bromide or any volatile alkyl halide. Also, instead of operating at a temperature of 110° F. to 125° F., we may operate at temperatures of from 90 to 175° F. and we may operate at pressures within the range of from 100 to 1000 lbs. per square inch. Also, instead of maintaining an isobutane to olefin external ratio of 2–3:1, we may use higher or lower isobutane to olefin ratios, such as from 1 to 50 or more mols of isobutane per mol of olefin.

To recapitulate, we have devised a new catalyst and method of preparing the same, which we have found to be effective in the alkylation of olefins with isoparaffins and, in particular, the lower olefins such as ethylene. The catalyst is an aluminum chloride-hydrocarbon complex prepared at elevated temperatures and pressure in the presence of an olefin and an isoparaffin, and our investigations have shown that the said catalyst is much more effective, both from the standpoint of yield and quality of the product, than aluminum chloride.

What we claim is:

1. The method of preparing a catalyst adapted to promote and catalyze the reaction between an isoparaffin and an olefin which comprises contacting aluminum chloride with an isoparaffin and a lower olefin and one of the class consisting of an alkyl chloride and hydrogen chloride at elevated temperatures and pressures for 5½ hours to produce a brown mobile liquid having a specific gravity of about 1.2.

2. In the alkylation of ethylene with isobutane, the improvement which comprises contacting ethylene and isobutane with a catalyst comprising an aluminum chloride-hydrocarbon complex produced by contacting for 5½ hours at 150° F. substantially pure aluminum chloride, ethylene and isobutane and one of the class consisting of ethyl chloride and hydrogen chloride.

3. The method specified in claim 2 in which ethyl chloride is added to the reactants in an amount equal to 2–6 volume per cent of the amount of isobutane added.

4. The method of producing 2,3 dimethylbutane which comprises contacting in a reaction zone at elevated temperatures and pressures, aluminum chloride, isobutane, ethylene and ethyl chloride, thereafter feeding isobutane and ethylene to said reaction zone in the ratio of from about at least 3 mols of isobutane to 1 mol of ethylene and ethyl chloride in the ratio of from about 2 to 6 volume per cent based on the isobutane, maintaining a temperature in the reaction zone of from about 90° to 175° F., maintaining a pressure of from about 100 to 1000 lbs. per square inch in said zone, continuing said reaction until from 450–700 mols of ethylene have been added and recovering from said zone a product containing 2,3 dimethylbutane.

5. The method specified in claim 4 in which a temperature of from about 110° to 125° F. is maintained in said reaction zone.

6. The method of claim 4 operated continuously in which aluminum chloride is charged to the reaction zone at a rate of 1 lb. of AlCl₃ per 200 to 800 mols of ethylene.

RALPH M. HILL.
CHARLES H. WATKINS.